US011283671B2

(12) United States Patent
Chaparala et al.

(10) Patent No.: US 11,283,671 B2
(45) Date of Patent: Mar. 22, 2022

(54) HANDLING ISSUES REPORTED BY NETWORK DEVICES (71) Applicant: HEWLETT PACKARD ENTERPRISE DEVELOPMENT LP, Houston, TX (US)

(72) Inventors: Anusha Chaparala, Bangalore (IN); Prabhu Murthy, Bangalore (IN); Rijil Abraham, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/804,129

(22) Filed: Feb. 28, 2020

(65) Prior Publication Data
US 2021/0273846 A1    Sep. 2, 2021

(51) Int. Cl.
*H04L 12/24*      (2006.01)
*H04L 41/0631*    (2022.01)
*H04L 41/0604*    (2022.01)
*H04L 41/0654*    (2022.01)
*H04L 41/069*     (2022.01)
*H04L 41/0677*    (2022.01)

(52) U.S. Cl.
CPC ........ *H04L 41/0636* (2013.01); *H04L 41/069* (2013.01); *H04L 41/0627* (2013.01); *H04L 41/0654* (2013.01); *H04L 41/0677* (2013.01)

(58) Field of Classification Search
CPC ............. H04L 41/0636; H04L 41/0654; H04L 41/0677; H04L 41/096
USPC ....................................................... 709/224
See application file for complete search history.

(56) References Cited

U.S. PATENT DOCUMENTS 8,988,998 B2      3/2015   Adam et al.
9,473,374 B2     10/2016   Beaty et al.
2003/0208593 A1*  11/2003  Bharati ............... G06F 11/1004
                                              709/224

(Continued)

FOREIGN PATENT DOCUMENTS

WO    2012/082726 A2    6/2012

OTHER PUBLICATIONS

Buragohain, Saumitra, "Open Hybrid Architecture—Bringing Cloud Native to On-Prem", available online at <https://blog.cloudera.com/open-hybrid-architecture-bringing-cloud-native-to-on-premises/>, Cloudera Blog, Nov. 5, 2018, 9 pages.

*Primary Examiner* — Alan S Chou
(74) *Attorney, Agent, or Firm* — Hewlett Packard Enterprise Patent Department (57) ABSTRACT Examples described herein relate to method and an issue management system for handling issues reported from network devices. The issue management system may receive an issue from a network device of a plurality of network devices arranged in one or more computing environments. The issue management system may determine whether there exists a solution corresponding to the issue in a solution repository based on the issue and a knowledge base. Further, in response to determining that there exists the solution corresponding to the issue, the issue management system may communicate the solution to a computing environment of the one or more computing environments that hosts the network device reporting the issue. Alternatively, if there exists no solution corresponding to the issue, the issue management system may relay the issue to a management station for the management station to address the issue.

20 Claims, 6 Drawing Sheets (56) References Cited

U.S. PATENT DOCUMENTS

| | | | |
|---|---|---|---|
| 2014/0136682 A1* | 5/2014 | Lukas | H04L 41/0886 709/224 |
| 2016/0119202 A1 | 4/2016 | Iyer et al. | |
| 2019/0026174 A1* | 1/2019 | Basavarajappa | H04L 41/069 |
| 2019/0215236 A1* | 7/2019 | Jain | H04L 41/0686 |
| 2020/0089586 A1* | 3/2020 | Wong | H04L 41/5054 |
| 2020/0184355 A1* | 6/2020 | Mehta | H04L 41/16 |
| 2020/0213874 A1* | 7/2020 | Tang | H04L 41/0823 |

* cited by examiner

HANDLING ISSUES REPORTED BY NETWORK DEVICES

BACKGROUND

Network devices may be arranged in one or more computing environments, for example, datacenters and/or network clouds. During operation, the network devices may generate issues such as events and/or alerts. The issues may be indicative of functioning of the network devices in a computing environment. Sometimes, several issues may be generated by the network devices in a short period of time due to performance of certain operations in the computing environment.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. As used herein, the term "includes" means includes but not limited to, the term "including" means including but not limited to. The term "based on" means based at least in part on.

Network devices in a computing environment may be distributed across one or more network clouds. The network devices may include any electronic device capable of storing data, processing data, and/or communicating data with external devices over a network. Examples of the network devices may include, but are not limited to, a server, a storage device, a network switch, a router, a mobile communication device, a desktop computer, a portable computer, a network device enclosure, or combinations thereof. The server may be a blade server, for example. The computing environment may be one or more clouds, one or more data centers, or a combination thereof.

During operation, the network devices may generate issues indicative of functioning of network devices. Such issues may include events, alerts, or both. Sometimes, several issues may be reported from multiple network clouds based on various operations performed by the network devices or in reaction to any change in an environment surrounding the network devices (e.g., due to change in temperature). The operation may be, for example, powering on or restarting a server in the computing environment, powering on an enclosure having several servers, adding a server to the enclosure, replacing power units of several rack-mount servers, and the like.

In a typical computing environment, a management station is coupled to the network devices deployed across multiple clouds. The issues generated by the network devices may be received by the management station. The management station may in-turn address the issues by acting upon the reported issues. For example, an issue such as an event may have to be acted upon by the management station, i.e., the event may trigger a job to be performed by the management station. The management station may in-turn determine one or more jobs to be performed for the received events. The jobs may include generating and/or identifying a solution and communicating the solution to the network devices reporting the issues. In certain instances, an event may trigger the management station to generate a request for resolution of the event. Such request may be addressed by a human operator which may generate a solution (e.g., a remedial script or a software patch) which can address the reported event.

Acting upon each such event may lead to wastage of computational resources of the management station. Moreover, since several events may be received by the management station due to performance of the certain operations at the network devices, acting upon all events may increase resource utilization at the management station and, at times, may lead to overloading of the management station. In certain instances, an excessive utilization of resources at the management station, may lead to the loss of functionality, data and even the availability of the management station causing unexpected downtime losses to customers.

Furthermore, to manage issues from multiple network clouds, the management station may communicate with software agents and network gateways deployed at each network cloud. Moreover, these software agents and network gateways may be managed and controlled by the management station. Management and control of increased number of the software agents and the network gateways may also increase load on the management station which may again lead to the loss of functionality of the management station.

In order to overcome abovementioned challenges, the present disclosure may provide an issue management system and method for handling issues reported from network devices. The issue management system may be coupled to both the management station and a plurality of network devices. The issue management system may receive an issue from a network device of the plurality of network devices arranged in one or more computing environments. The issue management system may determine whether there exists a solution corresponding to the issue in a solution repository based on the issue and a knowledge base. Further, in response to determining that there exists the solution corresponding to the issue, the issue management system may communicate the solution to a computing environment of the one or more computing environments that hosts the network device reporting the issue. Alternatively, if there exists no solution corresponding to the issue, the issue management system may relay the issue to the management station for the management station to address the issue.

As will be appreciated, the issue management system may act as an intermediator between the management station and the network devices and intercepts the issues reported by the network devices. Also, if a solution that can solve a given issue is already available with the issue management system, the issue management system may communicate the solution to the network cloud hosting the network device reporting the given issue. Consequently, not all issues that are reported from the multiple clouds may reach to the management station, thereby reducing the number of issues to be handled by the management station. Advantageously, workload on the management station may be reduced and a resource utilization of the management station may be contained. Accordingly, the management station may operate reliably and chances of unexpected downtime of the management station may be greatly reduced.

Figure 1:
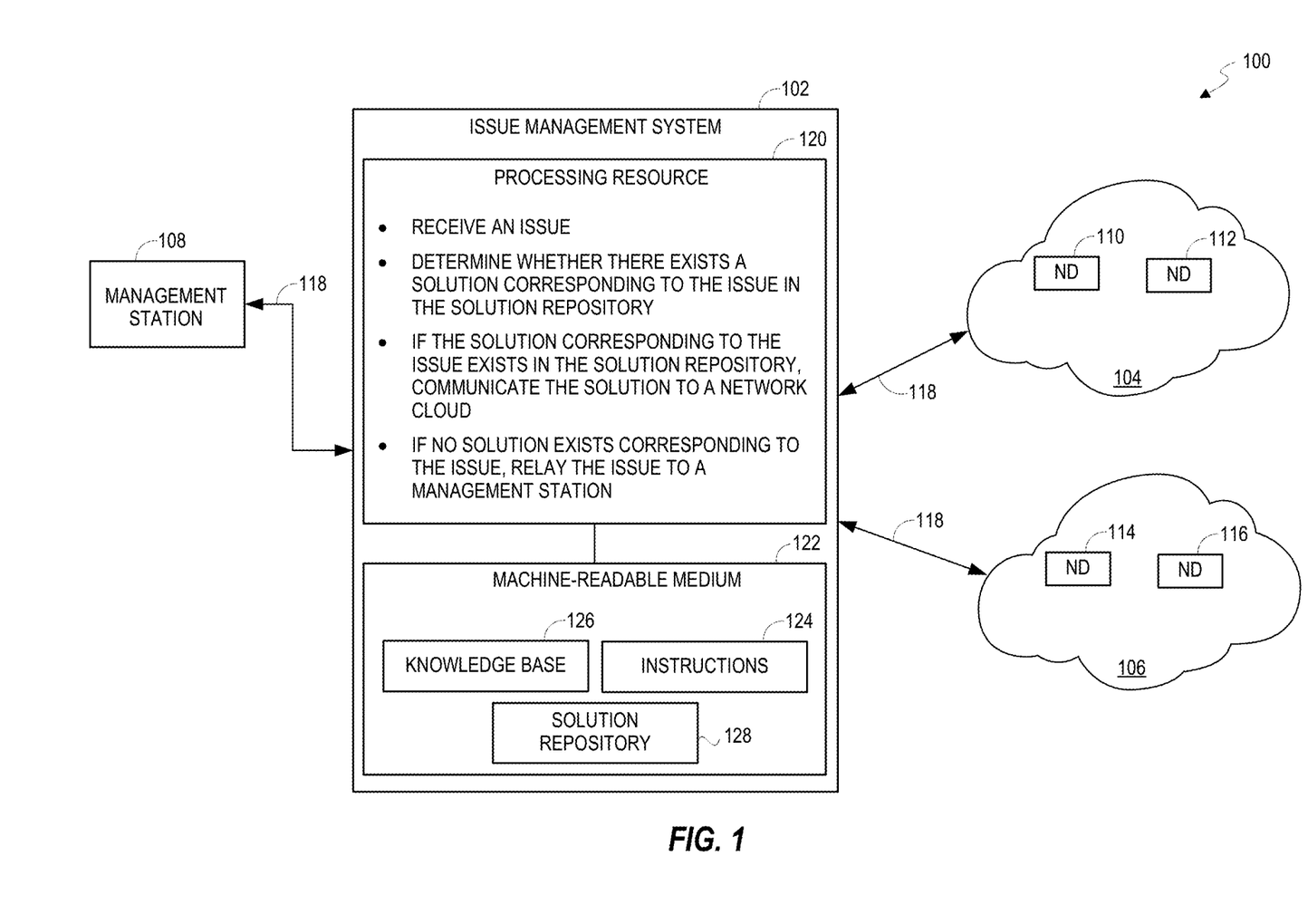
FIG. 1 is a system including an issue management system coupled to one or more clouds and a management station, in accordance with an example.

Referring now to drawings, in FIG. 1, an example system 100 is depicted, in accordance with an example. The system 100 of FIG. 1 may include an issue management system 102 that is coupled to one or more computing environments, for example, one or more network clouds 104,106 (hereinafter referred to as clouds 104, 106), and a management station 108. In some examples, the computing environments may include datacenters, as well. In certain examples, the computing environments coupled to the issue management system 102 may include a combination of the network clouds and the data centers.

The terms "network cloud" and "cloud" are interchangeably used in the description hereinafter. For ease of illustration, in the description hereinafter, the computing environments are described as the clouds 104, 106 without limiting the scope of the present disclosure. Each of the clouds 104 and 106 may include several network devices connected to each other via a network and operable as a single ecosystem. For illustration purposes, each of the clouds 104 and 106 are shown to include two network devices—for example, network devices 110 and 112 in the cloud 104 and the network devices 114 and 116 in the cloud 106. The network devices 110, 112, 114, and 116 are hereinafter collectively referred to as network devices 110-116. As will be appreciated, the clouds 104 and 106 may include any number of network devices, without limiting the scope of the present disclosure.

The network devices 110-116 may include any electronic device capable of storing data, processing data, and/or communicating data with external devices. Examples of the network devices 110-116 may include, but are not limited to, a server, a storage device, a network switch, a router, a mobile communication device, a desktop computer, a portable computer, a network device enclosure, WLAN access point, a container, a containerized application, a virtual machine, a Kubernet, or combinations thereof. The server may be a blade server, for example. The storage device may be a storage blade, for example. The network device enclosure may be a blade enclosure housing one or more blades (e.g., blade servers, storage blades, etc.). In some examples, the network devices 110-116 may include a storage space for storing data and/or one or more processing resources to process the data during their respective operations. In some examples, all of the network devices 110-116 may be of a same type (e.g., severs). In certain examples, the network devices 110-116 may include different types of devices. For instance, in the cloud 104, while the network device 110 may be a server, the network device 112 may be a storage device.

In each of the clouds 104 and 106, the network devices may be interconnected via a network (not shown) and are capable of communicating with each other via the network. Examples of such network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless (e.g., Wi-Fi®, cellular communication, satellite communication, Bluetooth, etc.) communication technologies. In some examples, the network may be enabled via private communication links including, but not limited to, communication links established via Bluetooth, cellular communication, optical communication, radio frequency communication, wired (e.g., copper), and the like. In some examples, the private communication links may be direct communication links between the network devices in a given cloud.

The clouds 104 and 106 may provide various services including but not limited to, providing a storage, providing a computing resources, hosting applications, content, and services, such as, social media services, video streaming, audio streaming, email services, etc. Further, the clouds 104 and 106 may be implemented as a public cloud, a private cloud, a hybrid cloud, or combinations thereof. For example, in some examples, the clouds 104 and 106 may be of a same type, such as, the public cloud, the private cloud, or the hybrid cloud. In some examples, the clouds 104 and 106 may be of different types. Furthermore, in some examples, the clouds 104, 106 may be managed my same or different cloud service facilities, such as, but not limited to Microsoft Azure®, Amazon Web Services™ (AWS™) and the like.

While services being rendered by the clouds 104, 106, the network devices 110-116 may generate issues as a result of operations performed by the network devices 110-116. By way of example, the network devices 110-116 may generate issues due to one or more of malfunctioning, problems, errors, change in configurations, firmware updates, and one or more actions such as power-ON, power-OFF, and restart corresponding to the network devices 110-116.

The issues generated by the network devices 110-116 may include, but are not limited to, alerts and events. The events may be lifecycle events such as resource added, resource updated, resource removed, resource status change, and the like. Some other examples of the event may include, but not limited to, Simple Network Management Protocol (SNMP) traps from a network device, system logs from any server or host, windows events, cluster information from Kubernets, or combinations thereof. Various examples of the alerts may include, but are not limited to, an alert indicative of attempt to connect a database, an alert indicative of a parameter (e.g., network bandwidth) exceeding a given threshold value, an alert indicative of a rate limiting, an alert indicative of storage space running-out, an alert indicative of a failure of deployment of a component (e.g., software, firmware, access policy, etc.), an alert indicative of a job not running appropriately, an alert indicative of creation of a new security group, or combinations thereof.

As previously described, in a traditional approach, network devices report several issues to a management station which may overload the management station and may result in an unplanned downtime of the management station. However, in accordance with aspects of the present disclosure, the network devices 110-116 of FIG. 1 may communicate the issues to the issue management system 102 instead of directly communicating the issues to the management station 108.

The issue management system 102 may be communicatively coupled to the clouds 104, 106 as well as the management system 108 via the links 118. In some examples, the links 118 may represent a network similar to the network that interconnects that the network devices in the clouds 104, 106, as described hereinabove. The issue management system 102 may be a physical device, for example, a physical computing device. In some other examples, the issue management system 102 may be hosted on a computing device as a virtual machine, a container, or a containerized application. The virtual machine, the container, or the containerized application may utilize resources (e.g., processing power and/or storage capacity) of the host computing device. The container or containerized application may be located on a single host computing device or distributed across multiple computing devices. The issue management system 102 may include a processing resource 120 and a machine-readable medium 122. The processing resource 120 may be coupled to the machine-readable medium 122.

The machine-readable medium 122 may be any electronic, magnetic, optical, or other physical storage device that may store data and/or executable instructions, for example, instructions 124. Therefore, the machine-readable medium 122 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 122 may be non-transitory. As described in detail herein, the machine-readable medium 122 may be encoded with executable instructions 124 for performing one or more methods, for example, methods described in FIGS. 3-5. In some examples, the machine-readable medium 122 may also store a knowledge base 126. Further, in some examples, the machine-readable medium 122 may also store a solution repository, such as a solution repository 128.

In some examples, the solution repository 128 may store one or more solutions corresponding to various issues that may be reported from the network devices 110-116 disposed in the clouds 104, 106. Example of the solutions may include, but are not limited to, a remedial script, a software, software patch, pre-determined set of instructions, or combinations thereof, that can solve reported issues. The processing resource 120 may keep the solution repository 128 updated based on the historical information about the reported issues and solutions that were used in solving the reported issues. In some examples, the solution repository 128 may include one or more than one solutions corresponding to certain issues. In certain examples, the issues may be categorized into one or more categories, and the solution repository 128 may store the solutions corresponding to one or more of such category of issues.

Further, in some examples, the knowledge base 126 may include one or more data sets corresponding to the clouds 104, 106. A data set may include information regarding one or more parameters pertaining to the categories of issues and solutions corresponding to the categories of issues. Further, in some examples, the knowledge base 126 may also include a weightage metric corresponding to the one or more data sets. In some examples, the parameters pertaining to a category of issues may represent situational aspects about the category of issue. Table-1 represented below may be representative of an example knowledge base 126.

TABLE 1

Example knowledge base 126 corresponding to the cloud 104

| | | Cloud 104 Categories of Issues | | | | | | | | |
|---|---|---|---|---|---|---|---|---|---|---|
| | | CPU utilization | | | Memory (RAM) utilization | | | Disk Utilization | | |
| | | D1 | D2 | D3 | D4 | D5 | D6 | D7 | D8 | D9 |
| | Weightage Metric | W1 | W2 | W3 | W4 | W5 | W6 | W7 | W8 | W9 |
| Parameters | Resource utilization (%) | 100 | 90 | 80 | 40 | 38 | 35 | 400 | 370 | 450 |
| | Threshold Limit (%) | 80 | 80 | 80 | 30 | 30 | 30 | 350 | 350 | 350 |
| | Availability of solution | Yes | Yes | Yes | No | No | No | Yes | Yes | Yes |

TABLE 1-continued

Example knowledge base 126 corresponding to the cloud 104

| | Cloud 104 Categories of Issues | | | | | | | | |
|---|---|---|---|---|---|---|---|---|---|
| | CPU utilization | | | Memory (RAM) utilization | | | Disk Utilization | | |
| | D1 | D2 | D3 | D4 | D5 | D6 | D7 | D8 | D9 |
| No. of available solutions | 2 | 2 | 1 | 0 | 0 | 0 | 2 | 2 | 1 |
| Log collection time | B | B | B | A, B | A, B | A, B | A | A | A |
| Average time taken to resolve an issue (hrs.) | 0.5 | 0.5 | 0.5 | 1 | 1 | 1 | 0.3 | 0.3 | 0.5 |
| Frequency of occurrence of the issue (count/hr.) | 4 | 3 | 2 | 4 | 4 | 4 | 5 | 5 | 2 |
| Any increase in resource utilization after issue is solved | Yes | Yes | Yes | No | No | No | Yes | Yes | Yes |

Table-1 represents an example knowledge base 126 having data corresponding to the issues reported from the network devices 110, 112 of the cloud 104. As will be appreciated, the knowledge base 126 may include information about various parameters corresponding to the issues reported from the network devices 114, 116 of the cloud 106, as well, which is not shown in Table-1 due to space constraint. For example, additional columns may be included in the Table-1 to show data corresponding to the cloud 106.

In the example knowledge base 126 shown in Table-1, the "CPU utilization," "Memory (RAM) utilization," and "Disk Utilization" may represent categories of the issues that have been or may be reported from the cloud 104. Without limiting the scope of the present disclosure, the reported issues may also be categorized in any additional or different categories (e.g., network utilization), and the knowledge base 126 may also include respective data. In some examples, although not shown, the machine-readable medium 122 may include a mapping of the issues and categories. For example, such mapping may be stored in the machine-readable medium 122 as a look-up table that lists various issues and a category corresponding to each issue.

Further, in some examples, the knowledge base 126 may include one or more data sets (e.g., data sets D1, D2, D3, D4, D5, D6, D7, D8, and D9) of information corresponding to the categories of issues. For example, Table-1 shows three data sets of information corresponding to each of the categories "CPU utilization," "Memory (RAM) utilization," and "Disk Utilization." Each data set may include information corresponding to one or more parameters. Examples parameters listed in Table-1 are resource utilization, threshold limit, availability of solution, number of available solutions, log collection time, average time taken to resolve an issue (hrs.), frequency of occurrence of the issue, and information regarding any increase in resource utilization after issue is solved. It may be noted that the present disclosure is not limited to the example parameters listed in Table-1. In some examples, the knowledge base 126 may include different number of parameters than illustrated in Table-1. Also, in some examples, the knowledge base 126 may include various other parameters than those shown in Table-1.

By way of example, the parameter—"resource availability" may be indicative of a percentage of available resources (e.g., 100% in case of data set D1). Further, the parameter—"threshold limit" may be indicative of maximum allowable percentage of the resource utilization (e.g., 80% in case of data set D1). The parameter—"availability of solution" may be indicative of whether a solution is available for the issues in a given category in the respective data set. The parameter—"availability of solution" may be represented with either "Yes" or "No," where "Yes" indicates that a solution is available and "No" indicates that there exists no solution. The parameter—"no. of available solutions" represents a number of solutions stored in the solution repository 128 that can resolve one or more issues pertaining to the given category (e.g., for data set D1, there exists 2 solutions).

In some examples, in order to resolve any issue, the issue management system 102 may collect various logs from the network device reporting the issue. Accordingly, the parameter—"log collection time" may indicate which logs are collected by the issue management system 102. The log collection time may be represented with characters "A" or "B," where, the character "A" represents logs post the occurrence of the issue and the character "B" represents logs before the occurrence of the issue. Furthermore, the parameter—"average time taken to resolve an issue (hrs.)" may refer to an average time that is taken to resolve the issue represented in hours, for example.

Moreover, the parameter—"frequency of occurrence of the issue" may represent a number issues reported per hour. Additionally, the parameter—"any increase in resource utilization after issue is solved" may indicate whether there has been any further increase in the resource utilization after the issue has been resolved. The parameter—"any increase in resource utilization after issue is solved" may be represented with either "Yes" or "No," where "Yes" indicates that an increase in the resource utilization has been reported, and "No" indicates that no increase in the resource utilization has been reported.

Although not shown, in some examples, the knowledge base 126 may also include links or pointers to various solutions corresponding to each of the data set D1-D9, if the number of available solutions for the respective data set is more than one (1). For example, for the data set D1, since there exists two solutions, the knowledge base 126 may also include pointers to two solutions in the solution repository 128. The solution repository 128 may store the respective solutions beginning at a memory location indicated by the pointers.

In some examples, the knowledge base 126 may also include a weightage metric corresponding to each of the data sets (e.g., data sets D1-D9). In the example Table-1, weightage metrics W1, W2,W3, W4, W5, W6, W7, W8, and W9 may correspond to the data sets D1, D2, D3, D4, D5, D6, D7, D8, and D9, respectively. In some examples, the weightage metrics W1-W9 may represent relative weights (i.e., importance or priority) of a data set among the data sets D1-D9. The weightage metrics W1-W9 may be represented in the form of percentage, a numeric value, an alpha numeric symbol, an alphabetic name, or a fuzzy value. By way of example, if the weightage metrics W1-W9 are represented as percentage values, a relative priority of the data sets in a given category of issues may be proportional to the percentage values of the weightage metrics W1-W9. In some examples, the weightage metrics W1-W9 may be pre-defined. In some other examples, the weightage metrics W1-W9 may be defined by a user or an administrator of the issue management system 102. In some examples, the weightage metrics W1-W9 may be updated based on a success rate of solutions referenced in the respective data sets.

The processing resource 120 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions 124 stored in the machine-readable medium 122, or combinations thereof. The processing resource 120 may fetch, decode, and execute the instructions 124 stored in the machine-readable medium 122 to handle issues reported from the network devices 110-116. As an alternative or in addition to executing the instructions 124, the processing resource 120 may include at least one integrated circuit (IC), control logic, electronic circuits, or combinations thereof that include a number of electronic components for performing the functionalities intended to be performed by the issue management system 102.

During operation, the issue management system 102 may receive an issue from a network device of a plurality of network devices (e.g., the network devices 110-116) arranged in one or more network clouds (e.g., the clouds 104, 106). In the description hereinafter, for illustration purposes, the issue is considered to be reported by the network device 110 from the cloud 104. The issue may be communicated from the network device 110 to the issue management system 102 via the link 118 between the cloud 104 and the issue management system 102. In some examples, the processing resource 120 may receive such issue reported by the network device 110. In the certain passages in the description, the issue received by the issue management system is also alternatively referred to as a reported issue.

Further, the processing resource 120 may determine whether there exists a solution corresponding to the issue in the solution repository 128 based on the issue and the knowledge base 126. For example, upon receipt of the issue, the processing resource 120 may identify a category of issue corresponding to the reported issue. The processing resource 120 may identify the category of issue based on the look-up table (described supra) containing relationship between various issues and corresponding categories stored in the machine-readable medium 122.

Further, once the category of issue is identified, the processing resource 120 may refer to the knowledge base 126 in order to determine whether there exists a solution corresponding to the identified category in one or more data sets of the identified category. For example, if the issue reported from the network device 110 corresponds to the "CPU utilization" category, the processing resource 120 may determine whether there exists a solution corresponding to the issue by checking the parameter, "availability of solution" in the knowledge base 126 for different data sets in the "CPU utilization" category. In the current example, there exists two solutions in each of the data sets D1-D3 of the "CPU utilization" category.

If it is determined that there exists a solution corresponding to the issue in the solution repository 128, the processing resource 120 may communicate the solution to a network cloud of the one or more network clouds 104, 106 that hosts the network device reporting the issue. In an ongoing example, the processing resource 120 may communicate the solution to the cloud 104 that hosts the network device 110 that reported the issue. In order to communicate the issue to the cloud 104, the processing resource 120 may identify the solution to be sent. Further, to identify the solution to be sent, the processing resource 120 may select a data set from the one or more data sets based on respective weightage metric. In the ongoing example, as previously noted, there exists two solutions in each of the data sets D1-D3. The processing resource 120 may select one of the data sets D1-D3 based on the respective weightage metric W1-W3. In some examples, the processing resource 120 may select a data set having a weightage metric indicative of highest priority/importance among the data sets in the given category. For example, if the weightage metrics W1-W3 are represented as numeric values, the processing resource 120 may select the data set from the data sets D1-D3 that has a weightage metric having the highest numeric value among the weightage metrics W1-W3. For instance, if the value of the weightage metric W1 is the highest among the weightage metrics W1-W3, the data set D1 may be selected by the processing resource 120.

Once a data set is selected, the processing resource 120 may select a solution for the reported issue from the available solutions in the selected data set. For example, in the selected data set D1, there exists two solutions. The processing resource 120 may select one of the two solutions which will be communicated to the network cloud (e.g., the cloud 104) hosting the network device (e.g., the network device 110) reporting the issue.

In some examples, the processing resource 120 may randomly select any one solution from the available solutions in the selected data set. In certain other examples, although not shown, the knowledge base 126 may also store a priority metric corresponding to each of the solutions in the data sets D1-D9. Like the weightage metric, the priority metric may also be represented in the form of percentage, a numeric value, an alpha numeric symbol, an alphabetic name, or a fuzzy value. The priority metric may be indicative of a success rate of a given solution in addressing various issues pertaining to respective category. In some examples, the processing resource 120 may keep the priority metric updated based on results of applying the solution to various issues. Accordingly, in some examples, the processing resource 120 may select a solution based corresponding priority metric. For instance, if the priority metrics for the solutions are represented as numeric values, the processing resource 120 may select a solution that has a priority metric with the highest numeric value among the priority metrics associated with all solutions in a given data set. Accordingly, there may be increased chances of the selected solution resolving the reported issue.

After an appropriate solution has been selected, the selected solution may be retrieved by the processing resource 120 from the solution repository 128 using the link or pointer information from the knowledge base 126, for example. The processing resource 120 may communicate the solution to the cloud 104 hosting the network device 110 that has reported the issue. The solution may be executed on the network device 110 and the issue reported by the network device 110 may be resolved.

In certain instances, the issue management system 102 may not contain information regarding any solution that can resolve a given reported issue. For example, if it is identified that the reported issue belongs to the "Memory (RAM) utilization" category, as indicated in Table-1, the issue management system 102 does not have any solution (e.g., the data sets D4-D6 suggests zero available solutions). In such a situation, the issue management system 102 may relay the issue to the management station 108 for the management station 108 to address the issue.

In some examples, if a solution is not available for the given issue in a knowledge base data (i.e., content of a knowledge base) of the cloud hosting the network device that reported the issue, the processing resource 120 may search for an appropriate solution in a knowledge base data corresponding to other clouds coupled to the issue management system 102. For example, if the issue management system 102 does not have any solution in the data corresponding to the cloud 104 (e.g., the data sets D4-D6 suggests zero available solutions), the processing resource 120 may search for a relevant solution in the data corresponding to the cloud 106. If the processing resource 120 identifies the relevant solution in the data corresponding to the cloud 106, the solution may be communicated to network cloud 104 hosting the network device 110 reporting the issue. Alternatively, the issue management system 102 may relay the issue to the management station 108 for the management station 108 to address the issue.

As will be appreciated, the issue management system 102 may act as an intermediator between the management station 1108 and the network devices 110-116 and intercepts the issues reported by the network devices. Also, if a solution that can solve a given issue is already available with the issue management system 102, the issue management system 102 may communicate the solution to the network cloud hosting the network device reporting the given issue. Consequently, not all issues that are reported from the multiple clouds 104, 106 may reach to the management station 108, thereby reducing the number of issues to be handled by the management station 108. Advantageously, workload on the management station 108 may be reduced and a resource utilization of the management station 108 may be contained. Accordingly, the management station 108 may operate reliably and chances of unexpected downtime of the management station 108 may be greatly reduced.

Further, in prior approaches, a management station may be coupled to several clouds and may require agents to be deployed at each such connected clouds to monitor and resolve various issues reported from these clouds. In accordance with aspects of the present disclosure, the management station 108 may be coupled to the issue management system 102 which in-turn is coupled to the clouds 104, 106. The issue management system 102 relays a portion of a number issues reported by the clouds to the management station 108. As such, the management station 108 may be freed-up from monitoring the network devices 110-116 of the clouds 104, 106. Accordingly, reliably of the management station 108 and chances of unexpected downtime of the management station 108 may further be greatly reduced.

Figure 2:
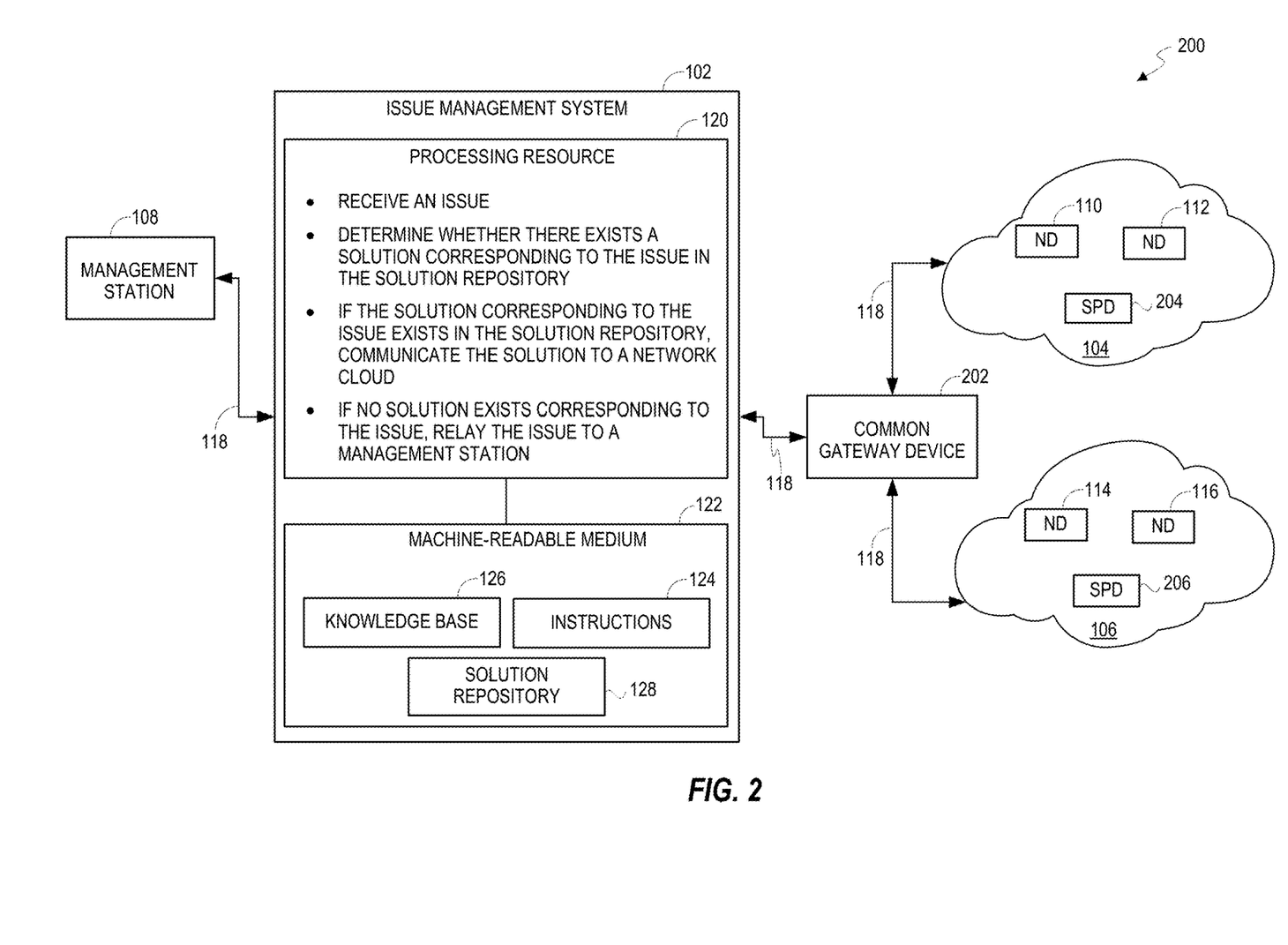
FIG. 2 is a system including an issue management system coupled to one or more clouds and a management station, in accordance with another example.

Referring now to FIG. 2, a system 200 is presented, in accordance with another example. The system 200 of FIG. 2 may be representative of one example of the system 100 of FIG. 1 and includes certain elements similar to those described in FIG. 1 which are marked with similar reference numerals, description of which is not repeated herein. In particular, in comparison to FIG. 1, the system 200 of FIG. 2 is shown to include additional components such as a common network gateway 202. Also, the clouds 104 and 106 are shown to include solution provider network devices 204 and 206, respectively. The solution provider network devices 204 and 206 may be representative of one example of any of the network devices 110-116. In some examples, any network device in a given cloud may be configured to be operated as a solution provider network device for the given cloud.

The common network gateway 202 may be communicatively coupled to the network clouds 104 and 106 as depicted in FIG. 2. The common network gateway 202 may be a network device that may route data traffic from one cloud (e.g., the cloud 104) to another cloud, or from one or more clouds (e.g., the clouds 104 and/or 106) to the issue management system 102, or vice versa. Examples of network devices that may serve as the common network gateway 202 may include, but are not limited to, a router, a computer (e.g., a personal computer, a portable computer, etc.), a network protocol conversion device, a firewall device, a server (e.g., a proxy server), or any other device that may enable data traffic flow to the one or more clouds 104, 106 and/or enable data traffic flow out of the one or more clouds 104, 106.

In some examples, the communication between the issue management system 102 and the clouds 104, 106 may be effected via the common network gateway 202. For example, in some examples, the issue management system 102 may transmit the solution corresponding to the issue reported by the network device 110 to the solution provider network device 204 in the cloud 104 via the common network gateway 202. As such, the processing resource 120 may first send the solution to the common network gateway 202. The common network gateway 202 may then transmit the solution to the solution provider network device 204. Further, the solution provider network device 204 may communicate the solution to the network device (e.g., the network device 110) that has reported the issue.

In some examples, one or more of the solution provider network devices 204, 206 may maintain a respective local solution repository (not shown). For example, the local solution repository stored in the solution provider network devices 204 may include one or more solutions that were previously received by the solution provider network devices 204. Also, in some examples, the issue management system 102 may also keep a track of which solutions are currently stored in such local solution repositories of the solution provider network devices 204, 206. Accordingly, if a solution corresponding to the reported issue is already stored in such local solution repositories of the solution provider network devices 204, 206, the issue management system 102 may send instructions to the respective solution provider network device 204, 206 (having the solution) to communicate the solution the network device reporting the issue.

Figure 3:
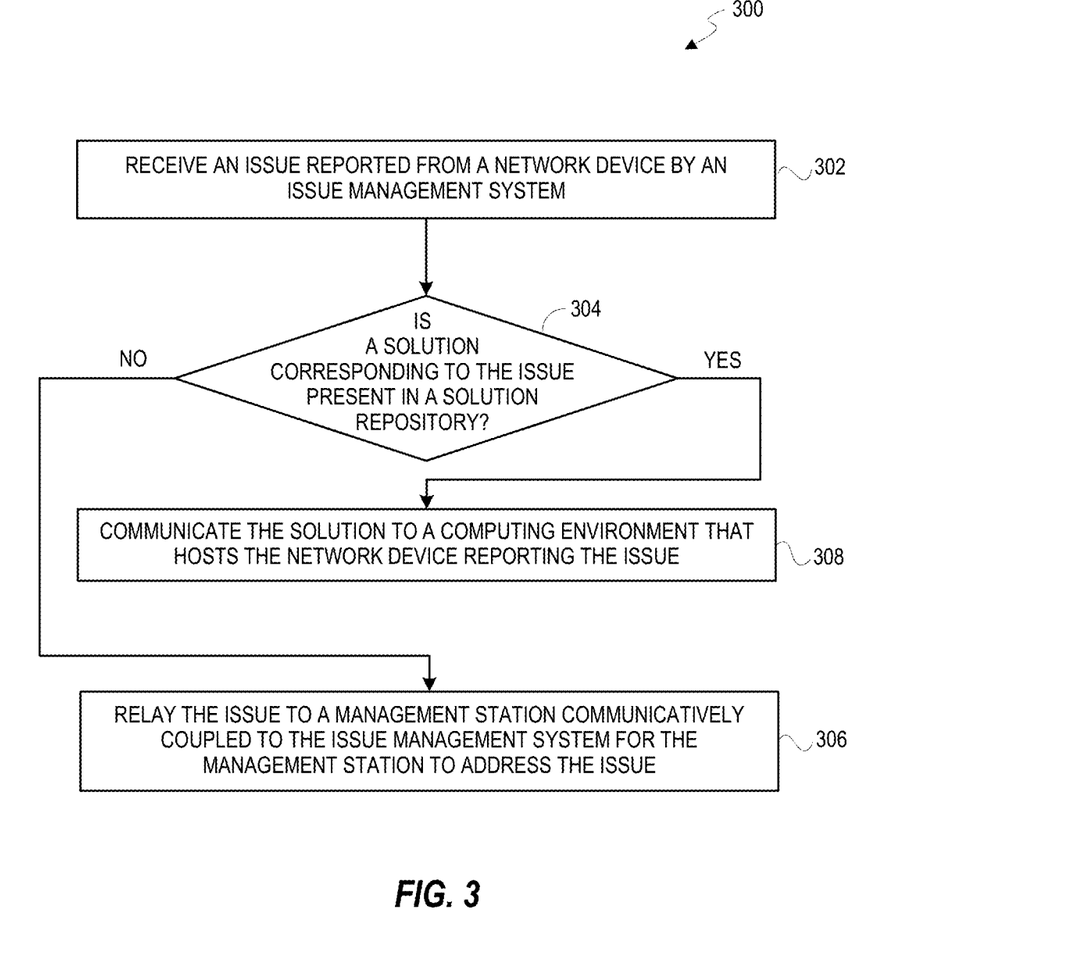
FIG. 3 is a flow diagram depicting a method for handling an issue reported by a network device, in accordance with an example.

Moving to FIG. 3, a flow diagram depicting a method 300 for handling an issue reported by a network device is presented, in accordance with an example. For illustration purposes, the method 300 will be described in conjunction with the system 100 of FIG. 1. As will be appreciated, the method 300 is also applicable to the system 200 of FIG. 2. The method 300 may include method blocks 302, 304, 306, and 308 (hereinafter collectively referred to as blocks 302-308) which may be performed by a processor based system, for example, the issue management system 102. In particular, each of the method blocks 302-308 may be executed by the processing resource 120 by executing the instructions 124 stored in the machine-readable medium 122 (see FIGS. 1 and 2).

During operation of the issue management system 102, at block 302, the issue management system 102 may receive an issue from a network device of a plurality of network devices 110-116 communicatively coupled to the issue management system 102 and arranged in one or more computing environments (e.g., the clouds 104, 106). For example, the issue may be reported by the network device 110 from the cloud 104 via the respective link 118. Further, at block 304, a check may be performed by the issue management system 102, to determine whether there exists a solution corresponding to the issue in a solution repository (e.g., the solution repository 128) based on the issue and a knowledge base (e.g., the knowledge base 126) in a similar fashion as described in conjunction with FIG. 1.

At block 304, if it is determined that there exists the solution corresponding to the issue, at block 308, the issue management system 102 may communicate the solution to a computing environment (e.g., the cloud 104) that hosts the network device 110 reporting the issue. However, at block 304, if it is determined that there exists no solution corresponding to the issue, the issue management system 102, at block 306, may relay the issue to the management station 108 for the management station 108 to address the issue. Additional details regarding various aspects related to the method blocks 302-308 have been described in conjunction with FIG. 1.

Figure 4:
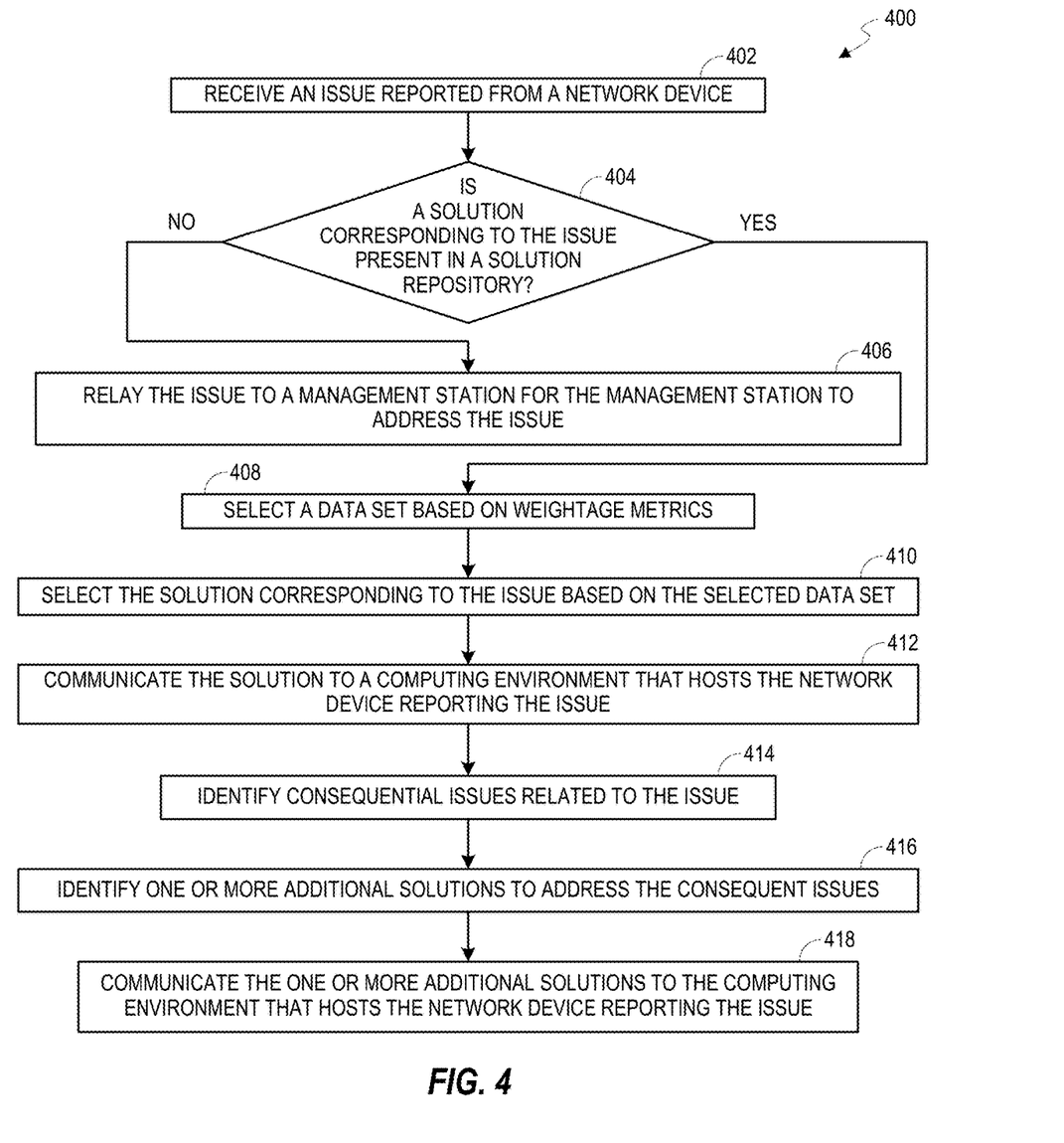
FIG. 4 is a flow diagram depicting a method for handling an issue reported by a network device, in accordance with another example.

Referring now to FIG. 4, a flow diagram depicting a method 400 for handling an issue reported by a network device is presented, in accordance with another example. In particular, the method 400 may provide certain additional details and method blocks for the method 300 of FIG. 3. For illustration purposes, the method 400 will be described in conjunction with the system 100 of FIG. 1. As will be appreciated, the method 400 is also applicable to the system 200 of FIG. 2. The method 400 may include method blocks 402, 404, 406, 408, 410, 412, 414, 416, and 418 (hereinafter collectively referred to as blocks 402-418) which may be performed by a processor based system, for example, the issue management system 102. In particular, each of the method blocks 402-418 may be executed by the processing resource 120 by executing the instructions 124 stored in the machine-readable medium 122 (see FIGS. 1 and 2).

Method block 402 may be similar to the method block 302 where an issue may be received by the issue management system 102 from a network device, for example, the network device 110 of the cloud 104. Further, at block 404, a check may be performed by the issue management system 102, to determine whether there exists a solution corresponding to the issue in the solution repository 128 based on the issue and the knowledge base 126, for example. The processing resource 120 may determine the existence of the solution by identifying a category of the issue, and by checking the parameter, "availability of solution" in the knowledge base 126 for different data sets in the identified category, as described in FIG. 1. At block 404, if it is determined that there exists no solution corresponding to the issue, the issue management system 102, at block 406, may relay the issue to the management station 108 for the management station 108 to address the issue.

At block 404, if it is determined that there exists the solution corresponding to the issue, at block 408, the issue management system 102 may select a data set from one or more data sets pertaining to one or more categories of issues based on weightage metrics. An example technique of selecting the data set based on weightage metrics has been described in FIG. 1.

Further, at block 410, the issue management system 102 may select the solution corresponding to the issue based on the selected data set. In some examples, the processing resource 120 may randomly select any one solution from the available solutions in the selected data set. In certain other examples, the processing resource 120 may select a solution based priority metrics corresponding to the available solutions in the selected data set. For instance, if the priority metrics for the solutions are represented as numeric values, the processing resource 120 may select the solution that has a priority metric with the highest numeric value among the priority metrics associated with all solutions in a given data set. After the solution is selected, the selected solution may be retrieved by the processing resource 120 from the solution repository 128. Moreover, at block 412, the issue management system 102 may communicate the solution to the network cloud 104 that hosts the network device 110 reporting the issue.

Furthermore, in some examples, an occurrence of any problem or error at the network device (e.g., the network device 110) may cause generation of consequential issues in additional to the reported issue. For example, if an event such as a resource (e.g., CPU) utilization of a VM (hosted on the network device 110) reaching a threshold limit is reported from the network device 110 and the resource utilization of the VM continues to increase, the VM may experience a restart. Accordingly, a restart event may likely to be reported by the network device 110 to the issue management system 102 following the event indicating the resource utilization of the VM reaching the threshold limit. Therefore, such VM restart event may be considered to be a consequential event to the event indicating the resource utilization of the VM reaching the threshold limit. In accordance with some aspects of the present disclosure, although not shown, the machine-readable medium 122 may include a mapping between issues and one or more corresponding consequential issues. For example, such mapping may be stored in the machine-readable medium 122 as a consequential issue look-up table that lists various consequential issues and for a given one or more issues.

Accordingly, in some examples, at block 414, the issue management system 102 may identify consequential issues related to the issue reported to the issue management system 102. In some examples, the processing resource 120 may identify the consequential issues related to the reported issue by checking the consequential issue look-up table in the machine-readable medium 122. If one or more consequential issues are identified, at block 416, the processing resource 120 may also identify one or more additional solutions to address the consequent issues. In some examples, the processing resource 120 may identify additional solutions to address the consequent issues in a similar fashion as identifying the solution for the reported issue using the knowledge base 126. Further, at block 418, the issue management system 102 may communicate the one or more additional solutions to the network cloud (e.g., the cloud 104) that hosts the network device (e.g., the network device 110) reporting the issue via the respective link 118, for example.

Figure 5:
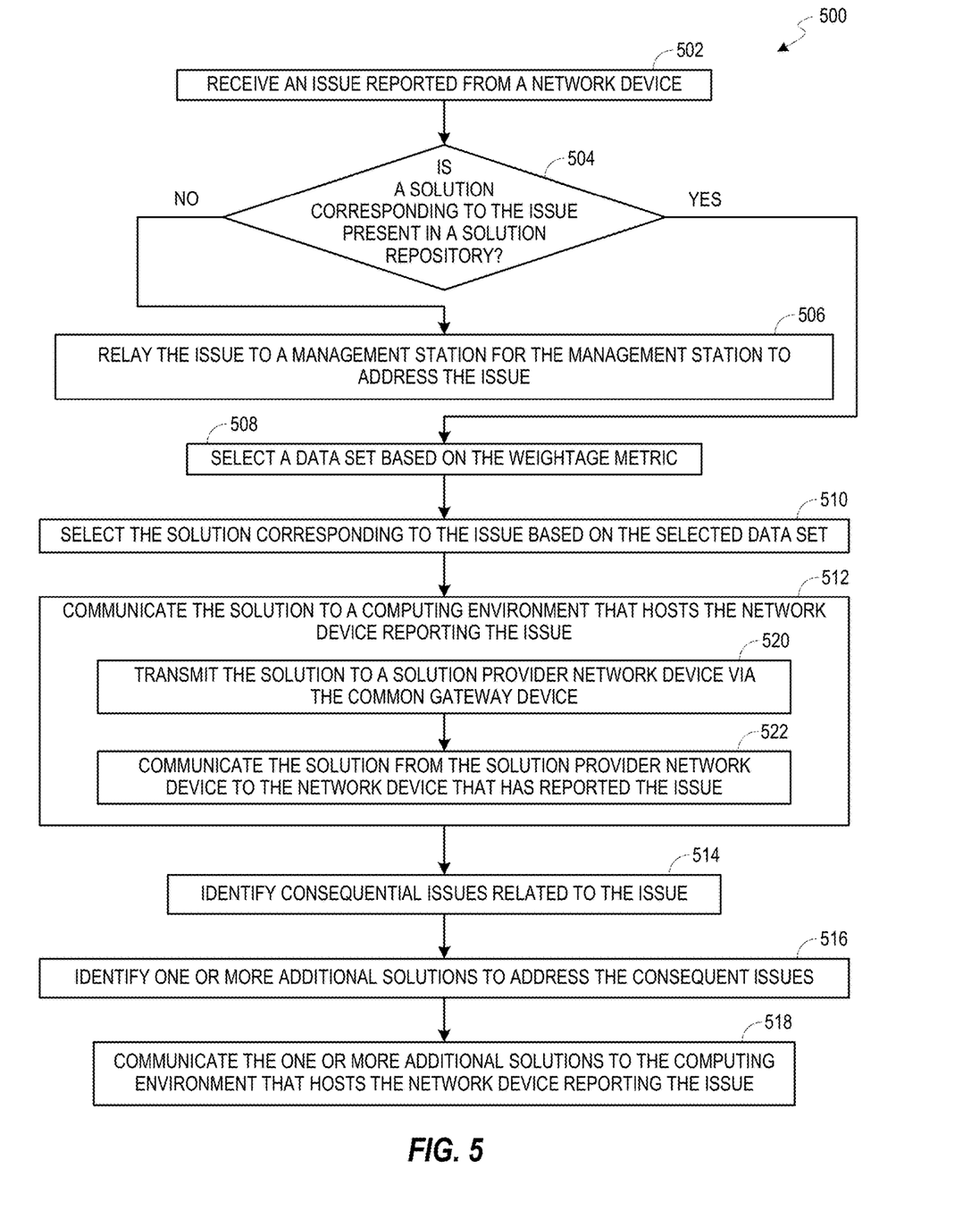
FIG. 5 is a flow diagram depicting a method for handling an issue reported by a network device, in accordance with yet another example.

Referring now to FIG. 5, a flow diagram depicting a method 500 for handling an issue reported by a network device is presented, in accordance with an example. The method 500 may be representative of one example of the method 400 of FIG. 4. In particular, the method 500 may provide certain additional method blocks for the method 400 of FIG. 4. For illustration purposes, the method 500 will be described in conjunction with the system 200 of FIG. 2. The method 500 may include method blocks 502, 504, 506, 508, 510, 514, 516, and 518 which are similar to method blocks 402, 404, 406, 408, 410, 414, 416, and 418, respectively, of FIG. 4, description of which is not repeated herein.

At block 512, the issue management system 102 may communicate the solution to the network cloud 104 that hosts the network device 110 reporting the issue. In some examples, communicating the solution at block 512 may include performing method at blocks 520 and 522. At block 520, the issue management system 102 may transmit the solution corresponding to the issue reported by the network device 110 to the solution provider network device 204 in the cloud 104 via the common network gateway 202. As such, the processing resource 120 may first send the solution to the common network gateway 202. The common network gateway 202 may then transmit the solution to the solution provider network device 204. Further, at block 522, the solution provider network device 204 may communicate the solution to the network device (e.g., the network device 110) that has reported the issue.

Figure 6:
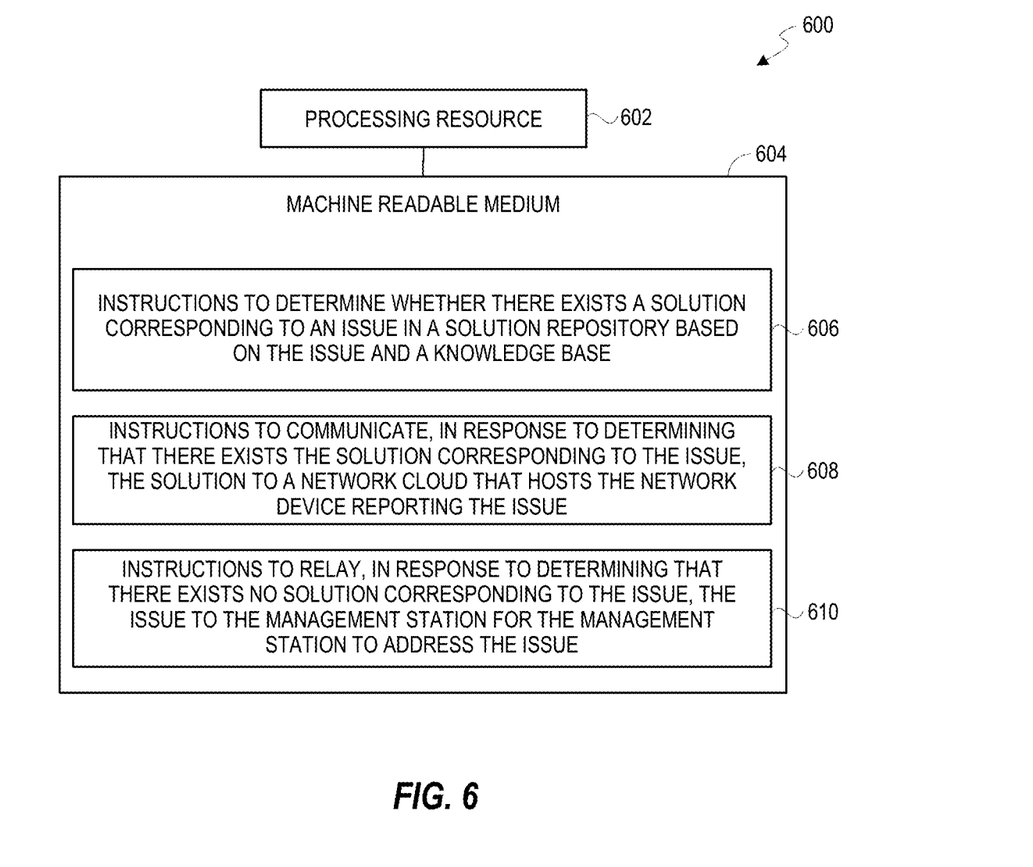
FIG. 6 is a block diagram depicting a processing resource and a machine-readable medium encoded with example instructions to handle an issue reported by a network device, in accordance with an example.

In FIG. 6, a block diagram 600 depicting a processing resource 602 and a machine-readable medium 604 encoded with example instructions to dynamically adjust a response time is presented, in accordance with an example. The machine-readable medium 604 may be non-transitory and is alternatively referred to as a non-transitory machine-readable medium 604. In some examples, the machine-readable medium 604 may be accessed by the processing resource 602. In some examples, the processing resource 602 may represent one example of the processing resource 120 of the issue management system 102. Further, the machine-readable medium 604 may represent one example of the machine-readable medium 122 of the issue management system 102.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606-610 for performing one or more methods, for example, the method 300 described in FIG. 3. The instructions 606-610 may represent one example of the instructions 124. Although not shown, in some examples, the machine-readable medium 604 may also include additional instructions to execute the methods described in FIGS. 4 and 5.

The processing resource 602 may be a physical device, for example, one or more CPU, one or more semiconductor-based microprocessor, one or more GPU, ASIC, FPGA, other hardware devices capable of retrieving and executing the instructions 606-610 stored in the machine-readable medium 604, or combinations thereof. In some examples, the processing resource 602 may fetch, decode, and execute the instructions 606-610 stored in the machine-readable medium 604 to handle an issue reported from a network device of the network devices 110-116. In certain examples, as an alternative or in addition to retrieving and executing the instructions 606-610, the processing resource 602 may include at least one IC, other control logic, other electronic circuits, or combinations thereof that include a number of electronic components for performing the functionalities intended to be performed by the issue management system 102.

The instructions 606, when executed, may cause the processing resource 602 to determine whether there exists a solution corresponding to an issue in a solution repository (e.g., the solution repository 128) based on the issue and a knowledge base (e.g., the knowledge base 126). The issue may be reported to the issue management system 102 from a network device (e.g., the network device 110) of the plurality of network devices 110-116 arranged in one or more network clouds 104, 106. Further, the instructions 608, when executed, may cause the processing resource 602 to communicate, in response to determining that there exists the solution corresponding to the issue, the solution to a network cloud (e.g., the cloud 104) that hosts the network device 110 reporting the issue. Moreover, the instructions 610, when executed, may cause the processing resource 602 to relay, in response to determining that there exists no solution corresponding to the issue, the issue to the management station 108 for the management station 108 to address the issue.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   intercepting, by an issue management system, an issue from a network device reported to a management station, wherein the issue management system is coupled to multiple network clouds, each of the network clouds including a plurality of network devices operable as a single ecosystem within each network cloud, the network device being included among network devices of a network cloud of the multiple network clouds, at least some of the network clouds belong to and are managed by different cloud service providers, and the issue management system is an intermediator between the management station and the plurality of network devices of the network clouds;

determining, by the issue management system, whether there exists a solution corresponding to the issue in a solution repository based on the issue and a knowledge base;

in response to determining that there exists the solution corresponding to the issue, communicating, by the issue management system, the solution to the network cloud; and in response to determining that there exists no solution corresponding to the issue, relaying, by the issue management system, the issue to the management station communicatively coupled to the issue management system for the management station to address the issue.

2. The method of claim 1, wherein the issue comprises an event or an alert,
wherein the event includes a Simple Network Management Protocol trap, a system log, an operating system event, or cluster information, and
wherein the alert indicates an attempt to connect a database, indicates that a parameter exceeds a threshold value, indicates rate limiting, indicates storage space running out, indicates component deployment failure, indicates a job not running appropriately, or indicates creation of a new security group.

3. The method of claim 1, wherein the solution comprises a remedial script, a software, software patch, pre-determined set of instructions, or combinations thereof.

4. The method of claim 1, wherein the issue management system receives the issue from the network device via a common network gateway coupled to the network clouds, wherein the common network gateway is a network device that is separate from the issue management system.

5. The method of claim 4, wherein communicating the solution to the network cloud comprises transmitting the solution to a solution provider network device in the network cloud via the common network gateway, wherein at least some of the network clouds have respective solution provider network devices separate from the issue management system and each of the solution provider network devices maintains a respective local solution repository.

6. The method of claim 5, further comprising communicating the solution from the solution provider network device to the network device that has reported the issue.

7. The method of claim 1,
wherein the knowledge base comprises one or more data sets corresponding to the network clouds,
wherein each data set of the one or more data sets comprises information regarding one or more parameters pertaining to a corresponding category among multiple categories of issues and to solutions in the corresponding category; and
wherein each data set includes a predefined weightage metric that indicates a relative priority among data sets within the corresponding category.

8. The method of claim 7, further comprising selecting a data set from the one or more data sets based on the weightage metric.

9. The method of claim 8, further comprising selecting the solution corresponding to the issue based on the selected data set.

10. The method of claim 1, further comprising:
identifying, by the issue management system, consequential issues related to the issue reported to the issue management system;
identifying, by the issue management system, one or more additional solutions to address the consequent issues; and
communicating, by the issue management system, the one or more additional solutions to the network cloud that hosts the network device reporting the issue.

11. The method of claim 1, wherein the network clouds include a public cloud and a private cloud.

12. A system comprising:
an issue management system communicatively coupled to multiple network clouds and a management station, wherein each of the network clouds includes a plurality of network devices operable as a single ecosystem with each network cloud, wherein at least some of the network clouds belong to and are managed by different cloud service providers, wherein the issue management system is an intermediator between the management station and the plurality of network devices, and wherein the issue management system comprises:
a machine-readable medium storing executable instructions; and
a processing resource coupled to the machine-readable medium, wherein the processing resource executes the instructions to:
intercept an issue reported to the issue management system from a network device of a network cloud of the network clouds;
determine whether there exists a solution corresponding to the issue in a solution repository based on the issue and a knowledge base;
communicate, in response to determining that there exists the solution corresponding to the issue, the solution to the network cloud; and
relay, in response to determining that there exists no solution corresponding to the issue, the issue to the management station for the management station to address the issue.

13. The system of claim 12, further comprising a common network gateway coupled to the issue management system, wherein the common network gateway is a network device that is separate from the issue management system and is coupled to the network clouds, wherein the common network gateway is to receive the issue reported by the network device and communicate the issue to the issue management system.

14. The system of claim 13, further comprising a solution provider network device disposed in each of the network clouds, wherein the solution provider network device is separate from the issue management system and is communicatively coupled to the common network gateway and one or more network devices in a respective cloud.

15. The system of claim 14, wherein the processing resource executes the instructions to transmit the solution to the solution provider network device in the network cloud via the common network gateway.

16. The system of claim 15, wherein the solution provider network device is to communicate the solution to the network device that has reported the issue.

17. The system of claim 12,
wherein the knowledge base comprises one or more data sets corresponding to the network clouds,
wherein each data set of the one or more data sets comprises information regarding one or parameters pertaining to a corresponding category among multiple categories of issues and to solutions in the corresponding category; and wherein each data set includes a predefined weightage metric that indicates a relative priority among data sets within the corresponding category.

18. The system of claim 17, wherein the processing resource executes the instructions to:

select a data set from the one or more data sets based on the weightage metric; and select the solution corresponding to the issue based on the selected data set.

19. The system of claim 12, wherein the processing resource executes the instructions to:

identify consequential issues related to the issue reported to the issue management system;

identify one or more additional solutions to address the consequent issues; and communicate the one or more additional solutions to the network cloud that hosts the network device reporting the issue.

20. A non-transitory machine-readable medium storing instructions executable by a processing resource, the instructions comprising:

instructions to intercept, at an issue management system couple to multiple network clouds that each include a plurality of network devices operable as a single ecosystem within each of the network clouds, an issue reported to a management station by a network device of network devices of a network cloud of the plurality of multiple network clouds wherein at least some of the network clouds belong to and are managed by different cloud service providers;

instructions to determine whether there exists a solution corresponding to an issue in a solution repository based on the issue and a knowledge base;

instructions to communicate, in response to determining that there exists the solution corresponding to the issue, the solution to the network cloud; and instructions to relay, in response to determining that there exists no solution corresponding to the issue, the issue to the management station for the management station to address the issue.

* * * * *